United States Patent
Boyce

(10) Patent No.: US 6,556,678 B1
(45) Date of Patent: Apr. 29, 2003

(54) COMMUNICATION SYSTEM

(75) Inventor: David L. Boyce, Damascus, PA (US)

(73) Assignee: Boyce Products, Ltd., Damascus, PA (US)

( * ) Notice: Subject to any disclaimer, the term of this patent is extended or adjusted under 35 U.S.C. 154(b) by 0 days.

(21) Appl. No.: 09/496,004

(22) Filed: Feb. 1, 2000

Related U.S. Application Data

(63) Continuation-in-part of application No. 09/409,123, filed on Sep. 30, 1999.

(51) Int. Cl.[7] .......................... H04M 1/00; A47B 81/00
(52) U.S. Cl. ................................. 379/454; 312/223.03
(58) Field of Search .......................... 379/453, 445, 379/455, 428.01, 420.01; 312/319.5, 319.8, 223.3, 194, 196, 7.2; 361/681; 248/316.4; 108/162

(56) References Cited

U.S. PATENT DOCUMENTS

| | | |
|---|---|---|
| 4,654,756 A | 3/1987 | Wilson et al. |
| 4,735,467 A | 4/1988 | Wolters |
| 5,159,883 A * | 11/1992 | Rosenberg .................. 108/162 |
| 5,321,579 A | 6/1994 | Brown et al. |
| 5,330,147 A * | 7/1994 | Volcheff et al. .......... 248/316.4 |
| 5,452,950 A | 9/1995 | Crenshaw et al. |
| 5,651,594 A | 7/1997 | Lechman |
| 5,655,822 A | 8/1997 | Roberts et al. |
| 5,709,156 A | 1/1998 | Gevaert et al. |
| 5,797,666 A | 8/1998 | Park |
| 6,059,385 A * | 5/2000 | Guhl ....................... 312/223.3 |
| 6,115,239 A * | 9/2000 | Kim .......................... 361/681 |
| 6,118,653 A * | 9/2000 | Kim .......................... 361/681 |

FOREIGN PATENT DOCUMENTS

| JP | 410074119 A * | 3/1998 | ............ 379/420.01 |
|---|---|---|---|

* cited by examiner

*Primary Examiner*—Jack Chiang
(74) *Attorney, Agent, or Firm*—MacCord Mason PLLC

(57) ABSTRACT

A table, and in particular a conference table, includes a communication module that is adapted to communicate with a remote source, such as a computer or a telephone. The communication module has a top section carrying a display screen that is moveable between a horizontal closed position and an open vertical position.

18 Claims, 6 Drawing Sheets

COMMUNICATION SYSTEM

This application is a continuation-in-part of U.S. patent application Ser. No. 09/409,123, filed Sep. 30, 1999.

BACKGROUND OF THE INVENTION

(1) Field of the Invention

The present invention relates to a communication system comprised of a table or work area, such as a conference table, that includes a communication module positioned within a recess in the top of the table or work area. In a first embodiment, the entire module is moveable between a lowered position within the recess, and a raised position in which a part of the module projects above the table top. In a second embodiment, the top section of the module is moveable between closed and open positions, while the remainder of the module is stationary.

(2) Description of the Prior Art

Historically, a conference table, the table being used herein to identify a table used by multiple persons as a gathering place to exchange information, has been used primarily to support writing pads and other materials when a group of individuals gathered around the table for discussions. With the recent explosion of communications technologies, conference tables and adjacent areas have become cluttered with various devices and associated wiring and other connectors. Such devices include telephones, conference speakers, computers, visual screens, various audio and video recording and play-back devices, etc.

As a result, conference tables have become storage surfaces for electronic devices, with wiring being strung across the table between components, both on and adjacent the table. Consequently, the tables have diminished value as a gathering place for individuals during meetings, and are difficult to set up and disassemble after meetings. Also, issues that arise during the meeting may necessitate delays while additional electronic equipment is set up for use by the participants. Even with proper equipment in place, it is often difficult to provide equal access to the equipment by all participants, without pulling the equipment around to various locations on the table, or requiring the participants to change seats. One central visual area is also often difficult for everyone to view equally.

Numerous kinds of electronic devices are an accepted necessity for modern business, with the devices being used for communications, calculations and transmission of information. There will also be a continuing need for groups of people to access these devices as part of the decision making process. Therefore, a system in which a plurality of persons could have ready access to such devices when at a conference table would be of considerable value. In addition, a system providing access to this system without cluttering the work surface, and being easily accessed or stored, would be of further value.

SUMMARY OF THE INVENTION

The present invention addresses these needs by providing a system comprised of a conference table with an opening in the surface of the table, and a retractable communication module that is stored within this opening. In one embodiment, the entire module is moveable within this opening between a lowered or stored position beneath this opening and a raised position in which the module projects above the surface of the table. In a second embodiment, the top of the module is moveable between a lowered position and a raised position, while the remainder of the module is stationary.

The Table

The exact construction of the table forming a part of the invention is not critical, so long as the table has a top with an upper work surface, and a module opening within the work surface extending through the tabletop. The table may be designed for use by a single individual, or by multiple individuals. The tabletop may be of one-piece, or of multiple pieces that are joined permanently together. Preferably, however, the table is of a modular construction, with various tabletop sections being releasibly joined to form the tabletop. Examples of suitable tables are described in commonly assigned U.S. patent application Ser. No. 09/216,717, filed Dec. 18, 1998, now U.S. Pat. No. 6,012,398, issued Jan. 11, 2000, and U.S. patent application Ser. No. 09/409,517, filed Sep. 30, 1999, both applications being incorporated herein by reference in their entirety.

In the tables described in these applications, a plurality of three-sided segments are joined together to form a three-sided table module. A plurality of these modules are then joined together to form a modular conference table. The dimensions of the segments are such that a three-sided opening is formed in the center of the table module when the three-sided segments are joined.

The tables described in these applications also includes a leg, cover or base with a central opening beneath each opening in the module top. Preferably, the leg opening is also three-sided, with alignment and dimensions like the opening in the module top. Thus, when a table of this configuration is used in the present invention, a communication module can be positioned with a retracted position within the leg opening, and a raised position extending from the leg opening up through the opening in the module top. Alternatively, the module can be fixed within the opening in the tabletop, with the leg opening being optionally used for storage of other components. When a conference table is formed of a plurality of table modules, communications modules can be positioned in a plurality of table module openings from which they can be extended for use, or retracted so that they are hidden beneath the table.

The Module

The exact configuration of the communications module will depend upon its particular end uses, and the level of sophistication desired. Basically, the communication module comprises a housing to support one or more communications devices, and a top or outer surface that is positioned substantially in a plane with the upper surface of the table top when the module is in its lowered or closed position. The communications devices, the term being used herein to designate various electronic devices, and components thereof used to communicate information either to or from participants, may include a display screen, a video camera, a speaker, a microphone, audio and video recording or play-back devices, computers, and various jacks.

Components of these devices may also be installed in the module, with the remainder of the particular device being at a remote location. The module may also include various kinds of input and output components, such as outlets, jacks, infrared receiver and transmitter ports, and the like. These devices and components may be arranged in the housing in any suitable manner depending upon the particular devices or components, ease of access, and overall aesthetic appearance of the module.

One embodiment of the module includes a hinged top with an upper surface that is substantially in a plane with the upper surface of the tabletop when the module is in a lowered or closed position. When the module is in its raised position, the hinged top can be opened to a vertical position to provide access to devices beneath the top. For example, a display screen may be attached to the inner surface of the top, so that the screen will be positioned vertically for viewing when the top is opened. The top and attached screen can be supported on a swivel base that is rotatable about a vertical axis so that the screen can be rotated up to 360° for viewing by different individuals around the table.

In a further enhancement of this embodiment, a computer can be positioned within the housing or at a remote location, e.g., beneath the table, and connected to the display. Different participants can then access the computer through a keyboard on the table and display output from the computer on the display screen. The keyboard can be connected to the computer through a wiring jack, or via an infrared port. The display screens of several other modules can be slaved to the first module, so that the information is displayed on a plurality of display screens.

The display screen can also be attached to a remote communication source, such as an audio/video feed from a remote conference table, or other remote source. In this instance, the communication module can also include a microphone and video camera, so that two-way communication is possible between the conference table and the remote source.

The configuration of the communication module is not critical to the invention, and the electronic components do not need to be completely enclosed within the module, so long as they are protected and supported. Preferably, the top of the module, whether stationary or hinged, will have a planar upper surface with an outer periphery corresponding to the dimensions of the table opening, so that the table opening is substantially filled by the communication module top when the communication module is in the lowered position.

The cross-sectional configuration of the component enclosure beneath the top also preferably corresponds to the dimensions of the opening to provide the maximum storage space within the housing. However, the top and enclosure may be of different shapes and sizes, e.g., the top can be triangular, rectangular or round. Preferably, at least one face of the enclosure, or a portion thereof is planar to facilitate positioning of jacks and/or connectors, and to provide access to. electronic components.

The module can be mounted on a mechanism to move the module between a lowered position within the table recess, and a raised position in which the module at least partially projects above the plane of the table top. Alternatively, the module can be comprised of a fixed lower section or housing to enclose some of the components, and a top section attached to the lower section and moveable between a closed position and an open position.

Moveable Embodiment

Various means, either mechanical or electrical, can be employed to move the communications module between lowered and raised positions. In a basic embodiment, the module support includes a spring or pneumatic cylinder that urges the module toward the raised position, and a stop or latch that retains the module in the lowered position, with the latch being released or actuated by forcing the module below its lowered position.

The module in this embodiment is moved from its lowered position, in which the top of the module is in a plane with the upper surface of the tabletop, to the raised position, by pressed down on the top of the module to release the latch. The spring or pneumatic cylinder then forces the module to the raised position. The module is returned to its lowered position by pressing down on the module until the latch is again engaged.

The module can also be moved between lowered and raised positions by attaching the module through a drive means to an electric motor. For example, the module can be attached to the upper end of a rod that is raised and lowered by a worm gear or a ball screw assembly attached to the motor drive shaft. A drive belt can also be used to connect the motor to the module. The module can also be raised and lowered pneumatically by attaching the module to a cylinder that is extending and retracted by pumping air or a fluid into and out of the cylinder. The exact mechanism used to raise and lower the module is not a critical aspect of the invention, and various mechanisms will occur to one skilled in the art after becoming familiar with the invention.

If the module is raised by an electrical mechanism, the system will also include at least one switch to activate the mechanism when the module is to be raised or lowered. This switch can be on the module or at some other location on the table. Various types of switches can be used. For example, the switch may be a mechanical or capacitance switch. The invention also contemplates switches that can be remotely actuated with an infrared beam from a handset. A plurality of modules can be connected in the same circuit so that the modules are raised or lowered together upon activation of a single switch.

Stationary Embodiment

Instead of being moveable between a lowered position and a raised position, the module may be constructed of a lower section that is fixed in a stationary position within the tabletop recess, and a top section that is moveable between a closed position and a raised position. In the closed position, the rear or back surface of the top section, i.e., the upper surface of the top section when the top section is horizontal, is preferably substantially in a plane with the tabletop upper surface when in a closed position. When opened, the top section is moved to a substantially vertical position.

The front or inner surface of the top section may include a display screen and other components, such as a camera, a microphone, and speakers. The module may include some or all of the components described above, and will function in the same manner. That is, the only significant difference between the stationary module and the moveable module is the fact that the stationary module, with the exception of the module top section, remains in a stationary position, while the moveable module is vertically moveable between lowered and raised positions.

Operation

In operation, after the participants are assembled around the uncluttered table, or an individual user is seated at the table, the communication module, if the moveable embodiment, is raised either manually or electronically. If the communication module includes a hinged top with a display screen, the top is raised to the vertical position for viewing of the screen. Various electronic devices can then be accessed, depending upon the configuration of the communication module. If the display is connected to a computer located beneath the table or at a remote location, e.g, the office mainframe, one or more of the participants can access the computer through a keyboard to display information, such as an internet website or a Powerpoint presentation, on the display screen.

If the module is properly equipped, a remote location can be telephoned to initiate a telephone conference. This conference can also include video access to the remote location through the display screen, and video transmission to the remote site, if a video camera is part of the module. A mix of computer-sourced information and video communications is also contemplated, with computer-sourced information also being transmitted to and from the remote location. For example, a display screen on one module can be used to display the image of participants at a remote location, while the display screen of another module can be used to display computer-sourced information.

Accordingly, one aspect of the present invention is to provide a communication system comprising a table having a tabletop with a horizontal upper surface and at least one opening extending vertically through the tabletop; and a communication module movable along a vertical pathway through the opening between a lowered position below the tabletop and a raised position in which at least of a part of the communication module extends through the opening above the upper surface of the tabletop.

Another aspect of the present invention is to provide a communication system comprised of a table having a tabletop with a horizontal upper surface and at least one opening extending vertically through the tabletop; and a communication module having a stored position and a raised position, the module including a display screen moveable between a horizontal position when the module is in the stored position, and a vertical position when the module is in the raised position.

Still another aspect of the present invention is to provide a communication system adapted to communicate with a remote source, the system comprising a table having a tabletop with a horizontal upper surface and at least one opening extending vertically through the tabletop; and a communication module a display screen; and a drive means adapted to move the display screen vertically between a stored position and a raised position wherein the display screen projects above the tabletop upper surface.

Another aspect of the invention is to provide a communication system comprising a table having a tabletop with a horizontal upper surface and at least one opening extending vertically through the tabletop; and a communication module positioned within the opening, the module including a top movable between a closed horizontal position, and an open vertical position.

Another aspect of the present invention is to provide a communication system comprised of a table having a tabletop with a horizontal upper surface and at least one opening extending vertically through the tabletop; and a communication module positioned in the table opening, the module including a display screen moveable between a horizontal position when the module is in the stored position, and a vertical position when the module is in the raised position.

These and other aspects of the present invention will become apparent to those skilled in the art after a reading of the following description of the preferred embodiment.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
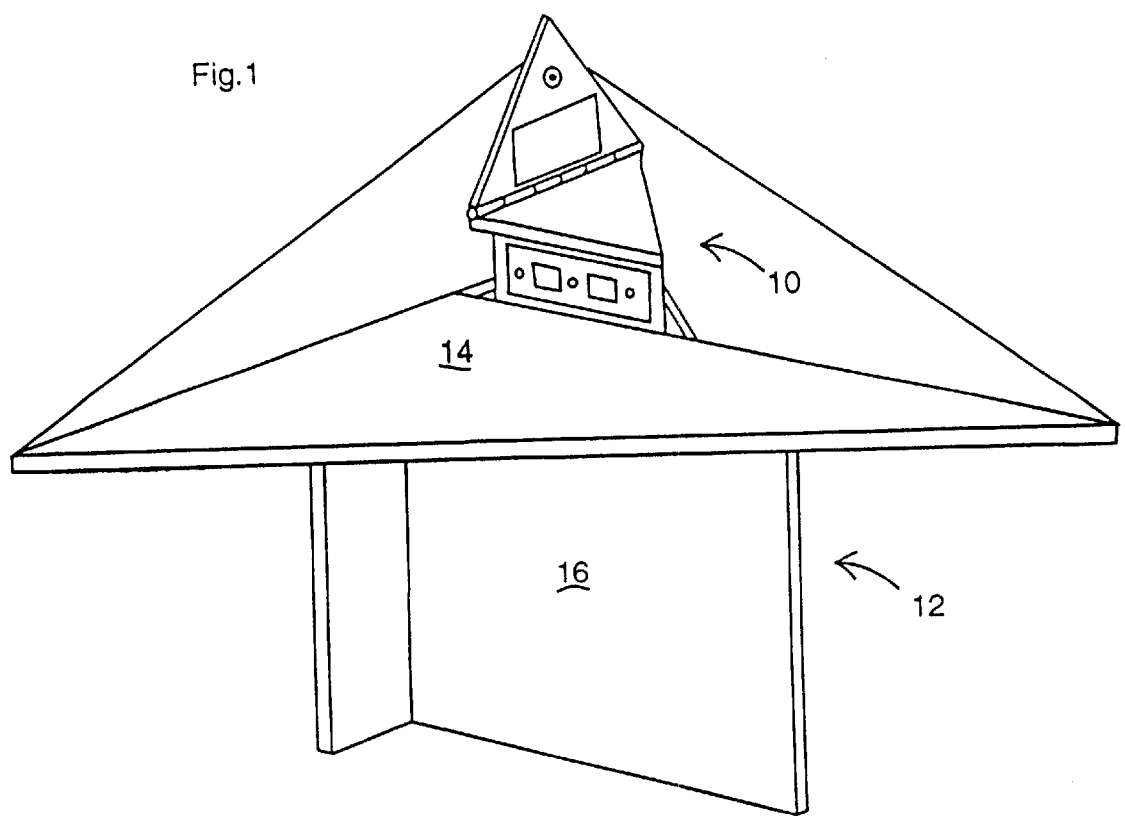
FIG. 1 is a perspective view of a table with a communication module in the raised position.
Figure 2:
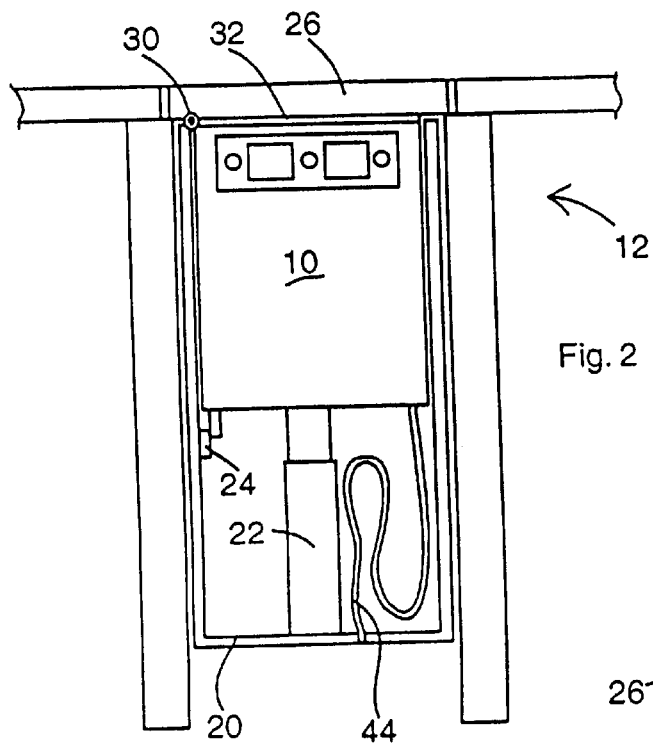
FIG. 2 is sectional side view of a table with a communication module in the closed position.
Figure 3:
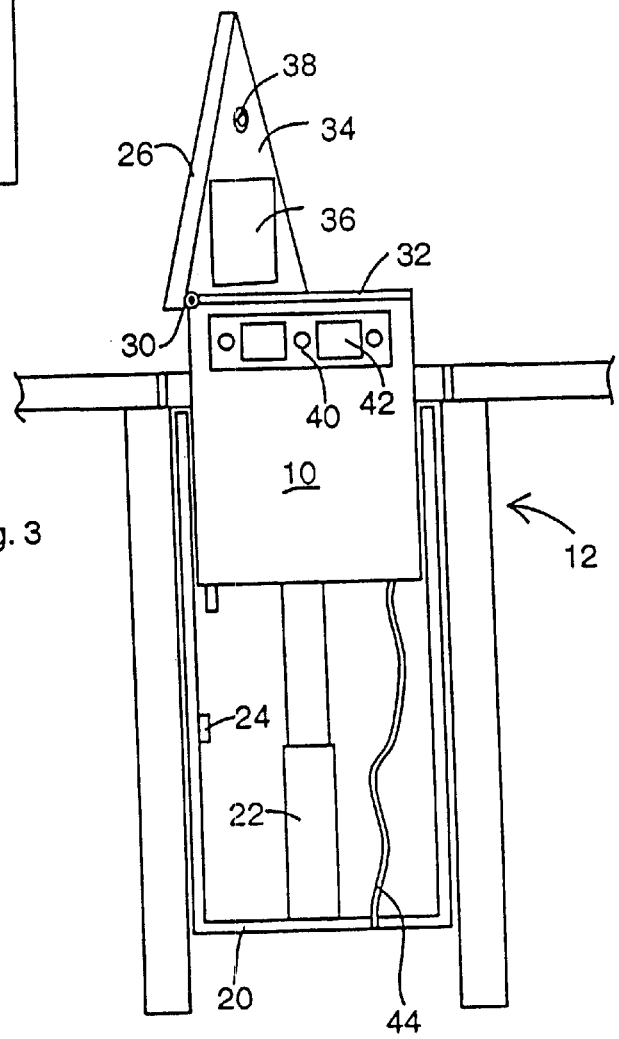
FIG. 3 is a sectional side view of the table and communication module of FIG. 2, with the module in the lowered position.

FIGS. 1–3 illustrates one preferred embodiment of the invention in which a communication module, generally 10, is mounted in a table, generally 12, and is moveable between a lowered position and a raised position. Table 12 is of a modular construction, such as is described in detail in the above-referenced co-pending applications, and is comprised of three interconnected segments 14, supported on a base 16.

Figure 4:
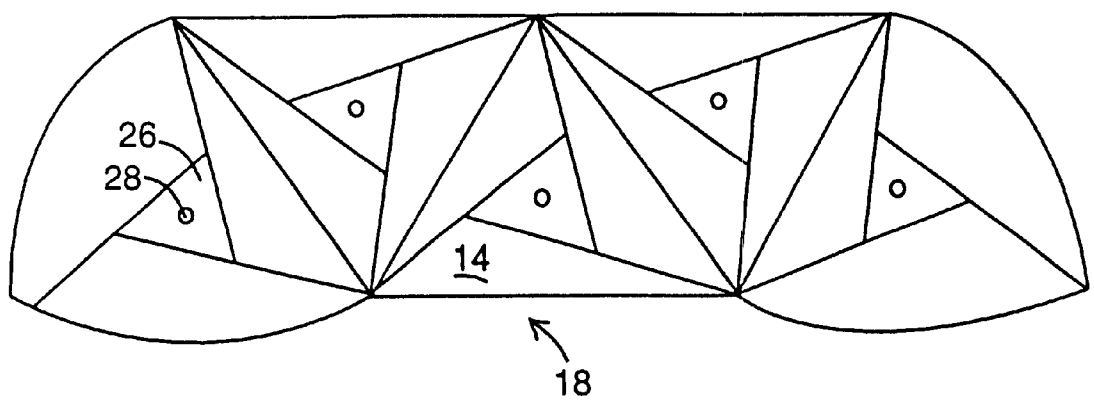
FIG. 4 is a top view of a modular table formed of a plurality of the tables or modules illustrated in FIG. 1, with the communication modules in the lowered position.
Figure 5:
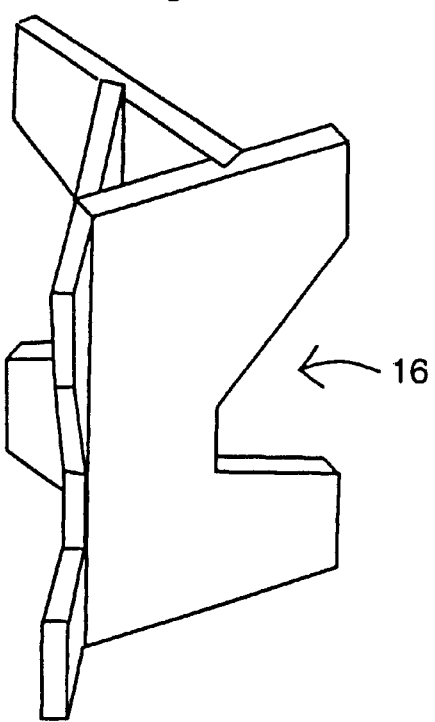
FIG. 5 is a perspective view of one type of support that may be used to support a tabletop and house a communication module.

FIG. 4 illustrates table 12 combined with a plurality of other modular tables to form a larger conference table, generally 16. As illustrated, each of the modular tables or modules used to form table 18 include an installed communication module 10. It will be understood, however, that table 18 can include only one or a plurality of modules 10. FIG. 5 illustrates one type of base 16 that can be used. It will be understood that other type of bases can be used, and that a base with a central vertical opening, while preferred, is not required.

Communication module 10 is carried in a housing 20 secured to base 16 or to the tabletop, and is moveable between a lowered position, as illustrated in FIG. 2, and a raised position, as illustrated in FIG. 3 with telescoping support 22.

As illustrated, telescoping support 22 is comprised of a pneumatic cylinder that urges module 10 to the raised position. Module 10 is held in the lowered position by a catch 24 that is released by pushing downwardly on module 10 to depress module 10 below its lowered position, releasing support 22 to move module 10 upwardly.

Other telescoping supports can be employed. For example, support 22 can be replaced by a motor geared to extend and retract a shaft attached to module 10 along a vertical axis parallel to the axis of movement of module 10. Support 22, if powered, can be controlled directly or remotely through a switch 28, which may be, for example, a capacitive switch or an infrared switch.

Module 10 includes a top 26 that is pivotal between a generally horizontal position, as illustrated in FIG. 2, and a generally vertical position, as illustrated in FIG. 3. Top 26 is attached with hinge 30 to a swivel base 32 that is rotatable in a horizontal plane. Top 26 has a lower surface 34 upon which may be mounted an display screen 36 and, optionally, a camera 38. A suitable screen is sold as Model No. LQ10D32A by Sharp Electronics. Camera 38 may be a video camera of the type commonly available for transmittal of images over the internet. A lock may also be included to prevent lowering of the module unless base 32 is in a desired alignment with the lower part of the module.

Module 10 also includes a connector panel 40 that includes one or more connectors 42. The particular design of panel 40 and the arrangement of connectors 42 shown in the drawings is for purposes of illustration only. It will be understood that the design and type of connectors will be determined by the intended use of the communication module. Connectors 42 may include, for instance, electrical outlets, telephone jacks, keyboard jacks, speaker jacks, infrared ports, etc.

Connectors 42, display screen 36, camera 38, and other electrical components of communication module 12 may be connected to a variety of sizes and of selected input and output sources, such as power, telephone and data sources (not shown) through appropriate wiring, which may be contained within a multi-wire harness 44. Suitable input and output sources include electrical outlets, telephone jacks, and computers. Outlets and jacks may be positioned in the floor beneath the table, or in an adjacent area. A connected computer may be located beneath the table or at a remote location. The computer, in turn, may be connected to a power source, a telephone outlet, a modem, a mainframe, etc.

Figure 6:
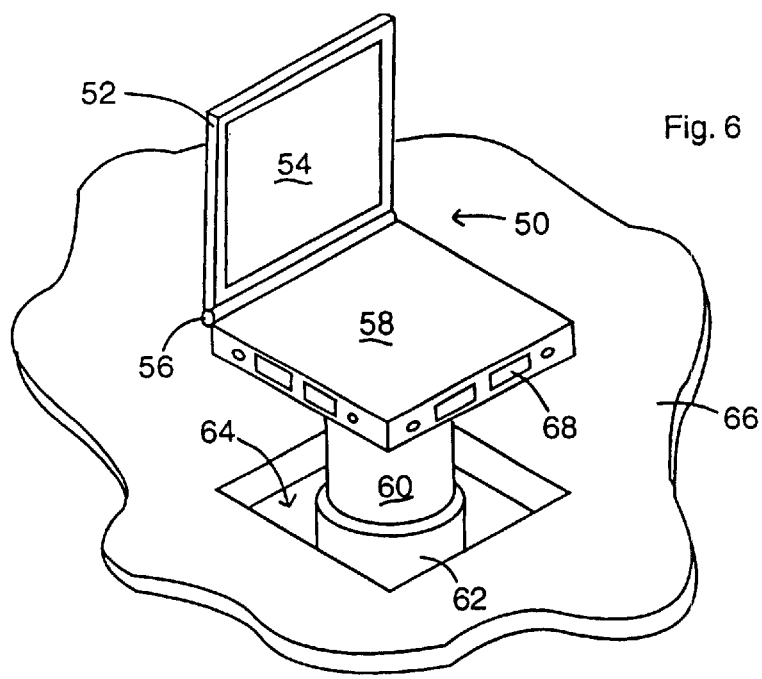
FIG. 6 is a perspective view of another type of communication module in the raised position.
Figure 7:
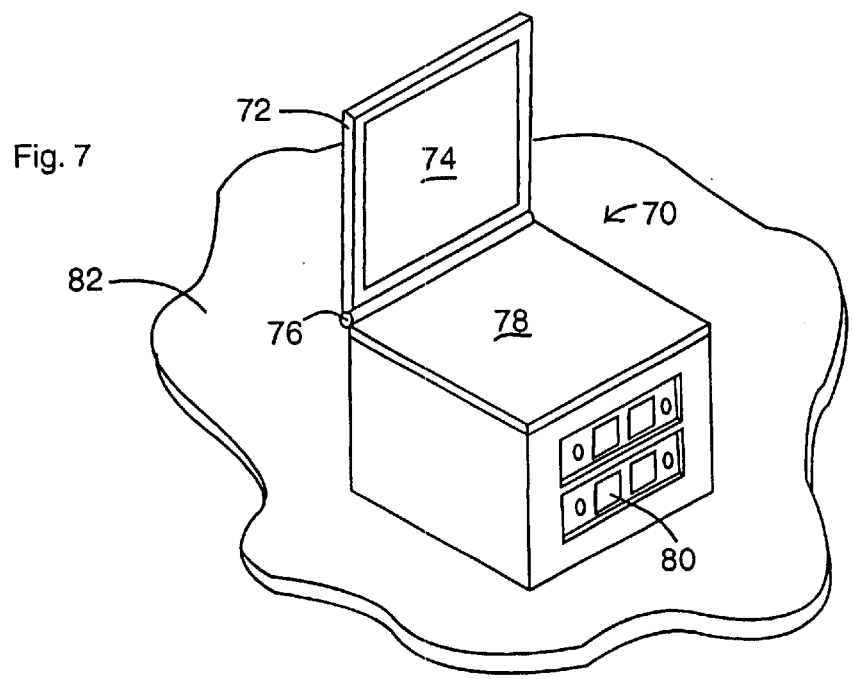
FIG. 7 is a perspective view of still another type of communication module in the raised position.

FIGS. 6 and 7 illustrate alternative designs for communication modules, with the modules being in their raised positions above the upper surfaces of a tabletop. Module 50, illustrated in FIG. 6 is comprised of a pivotal top 52 housing a display screen 54. Top 52 is pivotal about hinge 56 on a swivel base 58. Base 58, in turn is supported on vertically moveable support 60 that is adapted to move between raised and lowered positions within a cylindrical housing 62. When in a lowered position, top 52 fits within an opening 64 in tabletop 66, so that the upper surface of top 52 is in a plane with the upper surface of tabletop 66. Connectors 68 are located along the vertical edges of base 58.

Similarly, communication module 70, illustrated in FIG. 7, is comprised of a pivotal top 72 housing a display screen 74. Top 72 is pivotal about hinge 76 on a swivel base 78 that has a square or rectangular horizontal cross-section. Connectors 80 are located in a vertical face of module 70. Module 70 is adapted to moved between raised and lowered positions through an opening having a corresponding horizontal cross-section in tabletop 82.

Figure 8:
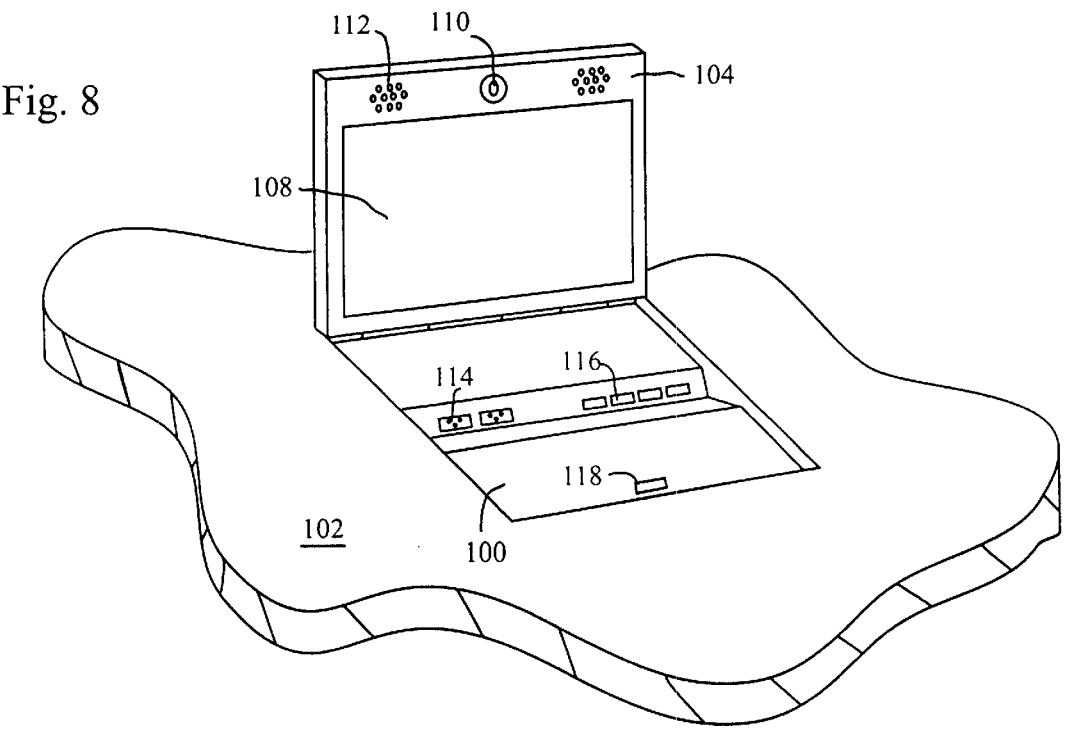
FIG. 8 is perspective view of a fixed embodiment of the invention with a rectangular module and display screen.
Figure 9:
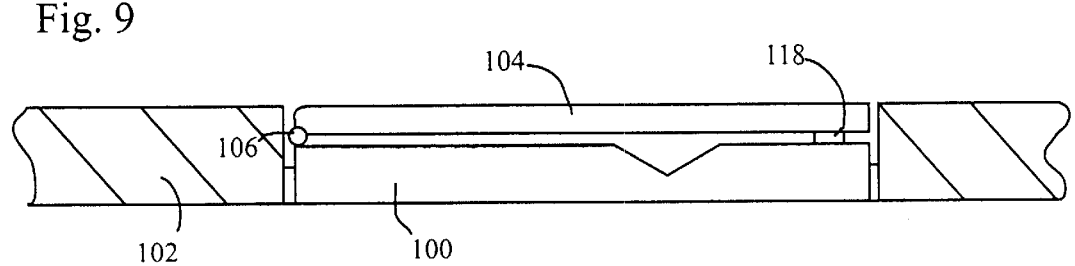
FIG. 9 is a side view of the fixed embodiment of FIG. 8.
Figure 10:
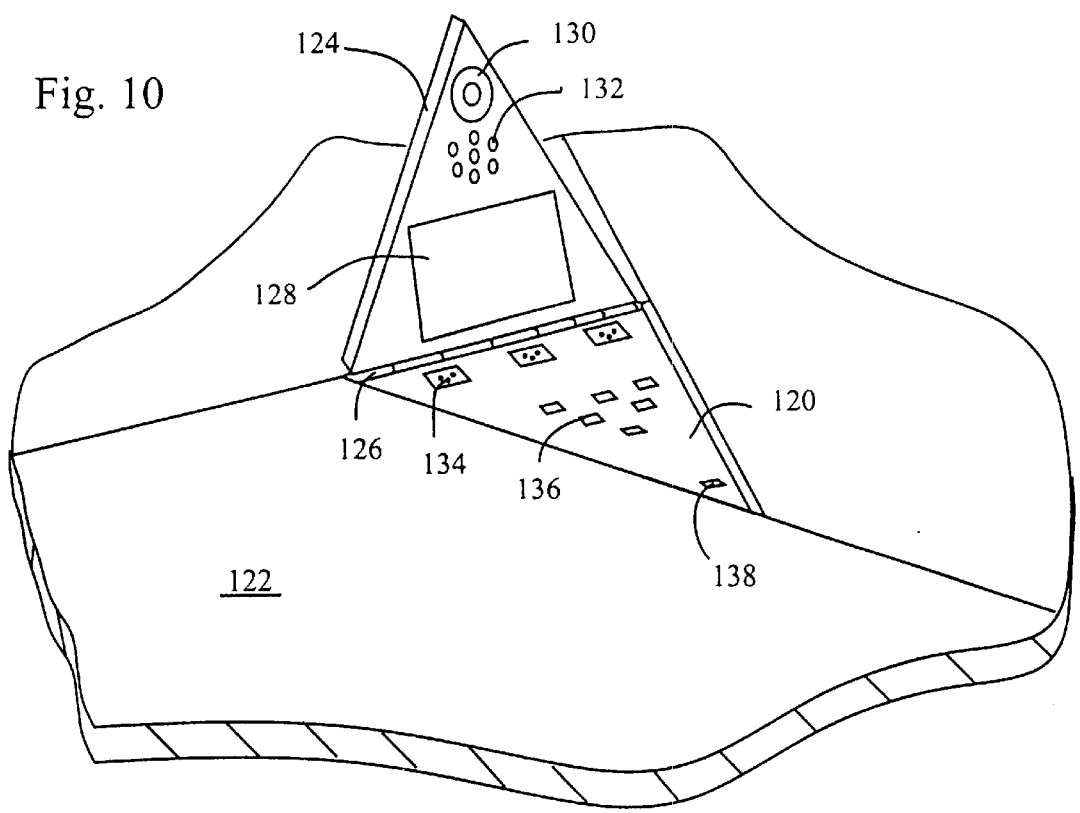
FIG. 10 is perspective view of another fixed embodiment of the invention with a triangular module and display screen.
Figure 11:
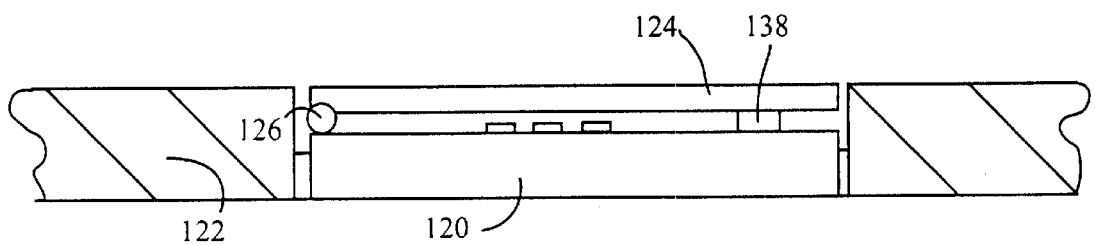
FIG. 11 is a side view of the fixed embodiment of FIG. 10.

FIGS. 8 and 9 illustrate an alternative embodiment in which the module is comprised of a fixed bottom section 100 attached to tabletop 102, and a top section 104 moveable between a horizontal closed position and a vertical open position. Top section 104 is attached to bottom section 100 by hinge 106. Top section includes a display screen 108 on its inner surface, along with a video camera 110 and speakers 112. Outlets 114 and switches 116 are positioned on the upper surface of bottom section 100. A latch 118 holds top section 104 in a closed position, and releases top section 104 when section 104 is pushed downward.

FIGS. 10 and 11 FIGS. 8 and 9 illustrate another alternative embodiment comprised of a fixed bottom section 120 attached to tabletop 122, and a top section 124 attached to bottom section 120 by hinge 126. The inner surface of top section 124 also includes a display screen 128, a video camera 130 and speaker 132. Outlets 134 and switches 136 are positioned on the upper surface of bottom section 120. Latch 138 is used to hold top section 124 in the closed position.

When system, referring to FIGS. 1–3, as not in use, each communication module 10 forming a part of the system is stored in its lowered position, as illustrated in FIG. 2, with top 26 in the horizontal position. The upper surface of top 26 is in a horizontal plane with the upper surface of the top of table 12, providing an uncluttered work surface that can be used for other purposes. Similarly, the top sections of the alternative embodiments shown if FIGS. 8–11, is held in the horizontal position by a latch. When in the lowered position, the back or rear surfaces of the top sections of the alternative embodiments are also substantially in a plane with the tabletop upper surface.

When communication module 10 is to be used, module 10 is moved to the raised position shown in FIGS. 1 and 3. If support 22 is a manually operated support, such as a pneumatic cylinder, module 10 is moved to the raised position by pushing downwardly on module 10 to release catch 24, so that support 22 elongates to push module 10 upwardly to the raised position. Alternatively, when an electrical support mechanism is employed, module 10 can be raised to its upright position by activating switch 28.

After module 10 is in the upright position, top 26 is pivoted, manually or with a powered drive mechanism, to the upright position, permitting viewing of display screen 36. Base 32 can be rotated so that screen 36 can be viewed from different sides of the table. Raising of top 26 also reveals camera 38, if used as a part of module 10. Various accessories, such as keyboards, laptops, speakers, microphones, telephones, etc., can be plugged into connectors 42, if used.

With the appropriate accessories, module 10 can be connected to a remote input or output device, such as computer, and thereby a database or the internet, a remote telephone transmission, etc., so that remote communications, data, and other information can be received by the communication module. Also, communications, data, and other information can be sent from the communication module to the input or output device.

Thus, for example, a group of individuals sitting around a conference table can use the communication module, or a group of the modules, to access stored computer data, including textual and numerical data, and manipulate the data. In another application, the internet can be accessed and the selected website displayed to the participants, with each individual, with an appropriately connected keyboard being able to access desired URLs, send email, etc. The participants can also engage in conference calls with one or more remote locations, with data or images or the remotely located individuals being displayed on the screen, and images of the participants being transmitted to the remote location using the digital camera.

The module shown in FIGS. 8–11 are used in the same manner except that the top section is pressed downward to disengage the latch and then raised, manually or under the influence of a spring, to the vertical position. Once open, the modules function in the same manner as the modules described above.

Certain modifications and improvements will occur to those skilled in the art upon a reading of the foregoing description. For example, instead of a rectangular screen, a triangular or circular screen can be used. Also, instead of relatively small individual units as illustrated, a single larger unit can be used. It should be understood that all such modifications and improvements have been deleted herein for the sake of conciseness and readability but are properly within the scope of the follow claims.

What is claimed is:

1. A communication system comprising:
   a) a table having a tabletop with a horizontal upper surface and at least one opening extending vertically through said tabletop; and
   b) a communication module positioned within said opening and being movable along a vertical pathway through said opening between a lowered position below said tabletop and a raised position in which at least a part of said communication module extends through said opening above the upper surface of said tabletop, said module including a top section pivotal between a closed position, and an open position in which the top section of said module extends above the upper surface of said tabletop, said top section including an upper surface that is substantially in a plane with said table top horizontal upper surface when said top section is in the closed position, and an inner surface opposite said upper surface, said inner surface including a display screen.

2. The system of claim 1, wherein said table is constructed of a plurality of modules, at least one of said modules including an opening.

3. The system of claim 1, wherein said tabletop is constructed of three three-sided segments.

4. The system of claim 1, wherein said module includes a lower fixed section, and a hinge joining said top section to said lower section, said top section being in a horizontal position when in the closed position, and pivotal about said hinge to the open position.

5. The system of claim 1, wherein said module includes means to connect said module to a remote computer.

6. The system of claim 1, wherein said module includes a telephone communication device.

7. The system of claim 1, including a latch to hold said top section in the closed position, said latch being actuated when said top section is pushed downward.

8. The system of claim 1, wherein said module includes a lower fixed section having an upper surface, and switches mounted on said upper surface.

9. The system of claim 1, wherein said module and said tabletop opening are rectangular.

10. A communication system comprised of:
    a) a table having a tabletop with a horizontal upper surface and at least one opening extending vertically through said tabletop; and
    b) a communication module including a top section with a display screen, said top section being moveable between a closed horizontal position within said tabletop opening and an open vertical position, said top section having an upper surface in a plane with said tabletop upper surface when said top section is in the closed horizontal position, said module being moveable along a vertical pathway through said opening between a lowered position below said tabletop and a raised position in which at least a part of the communication module extends through the opening above the upper surface of said tabletop.

11. The system of claim 10, wherein said module includes a connector to connect said display screen to a remote computer.

12. The system of claim 10, wherein said module includes a connector to connect said display screen to a remote video feed.

13. The system of claim 10, wherein said top section includes a video camera.

14. The system of claim 10, wherein said module further including a fixed bottom section, said top section being hinged to said bottom section.

15. The system of claim 10, further including a keyboard.

16. A communication system comprised of:
    a) a conference table having a tabletop with a horizontal upper surface and a plurality of openings extending vertically through said tabletop; and
    b) a plurality of communication modules, one for each of said openings, each of said modules being moveable along a vertical pathway through said openings between a lowered position below said tabletop and a raised, position in which at least part of said communication modules extend through said openings above the upper surface of said tabletop, said modules each including
       i) a top section having a back surface and an inner surface, and being moveable between a horizontal position when said module is in the lowered position, and a vertical position when said module is in the raised position, said back surface being in a plane with said tabletop upper surface when said module is in said lowered position;
       ii) an electronic display screen mounted on the inner surface of said top section;
       iii) a connector to connect the display screen to a remote data source.

17. The system of claim 16, wherein said module further includes a bottom section mounted in a fixed position relative to said tabletop.

18. The system of claim 16, wherein said table includes a support base supporting said tabletop, said base including a storage opening beneath the opening in said tabletop.

* * * * *